(12) United States Patent
Tang

(10) Patent No.: US 10,957,250 B2
(45) Date of Patent: Mar. 23, 2021

(54) TERMINAL DEVICE, SENSING METHOD AND APPARATUS WITH SENSOR FOR FINGERPRINT IDENTIFICATION

(71) Applicant: BEIJING XIAOMI MOBILE SOFTWARE CO., LTD., Beijing (CN)

(72) Inventor: Ju Tang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/427,252

(22) Filed: May 30, 2019

(65) Prior Publication Data

US 2019/0371239 A1 Dec. 5, 2019

(30) Foreign Application Priority Data

May 31, 2018 (CN) .......................... 201810550110.3

(51) Int. Cl.
*G09G 3/20* (2006.01)
*G09G 3/3233* (2016.01)
(Continued)

(52) U.S. Cl.
CPC .......... *G09G 3/3233* (2013.01); *G09G 3/2074* (2013.01); *G09G 5/10* (2013.01); *H04N 5/2353* (2013.01); *G06K 9/0004* (2013.01)

(58) Field of Classification Search
CPC ...... G09G 3/3233; G09G 3/2074; G09G 5/10; G06F 21/32; G06F 3/042; G06F 3/0418;
(Continued)

(56) References Cited

U.S. PATENT DOCUMENTS

2005/0156950 A1* 7/2005 Jang ..................... G09G 3/3406
345/690
2008/0273768 A1* 11/2008 Dennis ............... G06K 9/00899
382/124
(Continued)

FOREIGN PATENT DOCUMENTS

CN 105956584 A 9/2016
CN 106603836 A 4/2017
(Continued)

OTHER PUBLICATIONS

Supplementary European Search Report in the European Application No. 19175605.5, dated Oct. 21, 2019, (6p).
(Continued)

*Primary Examiner* — Ryan A Lubit
(74) *Attorney, Agent, or Firm* — Arch & Lake LLP

(57) ABSTRACT

A terminal device, a sensing method, and a sensing apparatus are provided. The terminal device include a plurality of optical sensors, wherein the plurality of optical sensors are arranged in a plurality of sub-regions, and each of the plurality of sub-regions has a respective optical parameter; and a processor, configured to: control the optical sensor in each sub-region to, upon detecting a target object, sense the target object with a first optical parameter value, and obtain a first sensing signal in each sub-region; determine a target signal range according to the first sensing signal in each sub-region; determine a second optical parameter value with respect to each sub-region according to the first sensing signal in the sub-region and the target signal range; and set the optical parameter of each sub-region to the second optical parameter value.

19 Claims, 10 Drawing Sheets

(51) Int. Cl.
  *G09G 5/10* (2006.01)
  *H04N 5/235* (2006.01)
  *G06K 9/00* (2006.01)

(58) Field of Classification Search
  CPC ...... G09K 9/0004; G09K 9/22; H04N 5/2353; H04M 2250/12; H04M 1/72569
  See application file for complete search history.

(56) References Cited

U.S. PATENT DOCUMENTS

| | | | |
|---|---|---|---|
| 2010/0020205 A1* | 1/2010 | Ishida | H04N 9/045 |
| | | | 348/241 |
| 2014/0341446 A1 | 11/2014 | Hare et al. | |
| 2017/0046554 A1 | 2/2017 | Subbarao et al. | |
| 2017/0085813 A1* | 3/2017 | Reinhold | H04N 5/2354 |
| 2018/0129798 A1 | 5/2018 | He et al. | |
| 2018/0288301 A1* | 10/2018 | Fu | G06K 9/2027 |
| 2018/0336392 A1 | 11/2018 | Zhang et al. | |
| 2019/0052790 A1* | 2/2019 | Kang | G06T 5/007 |

FOREIGN PATENT DOCUMENTS

| | | |
|---|---|---|
| CN | 107181559 A | 9/2017 |
| CN | 107292235 A | 10/2017 |
| CN | 107656665 A | 2/2018 |
| CN | 107798303 A | 3/2018 |
| CN | 107832689 A | 3/2018 |
| CN | 107958185 A | 4/2018 |
| CN | 107959752 A | 4/2018 |
| KR | 101778008 B1 | 9/2017 |

OTHER PUBLICATIONS

First Office Action of the Chinese Application No. 201810550110.3, dated Mar. 24, 2020 with English translation (11p).
Notice of Allowance of the Chinese Application No. 201810550110.3, dated Aug. 18, 2020 with English translation (4p).

* cited by examiner

TERMINAL DEVICE, SENSING METHOD AND APPARATUS WITH SENSOR FOR FINGERPRINT IDENTIFICATION

CROSS-REFERENCE TO RELATED APPLICATION

This application is based on and claims priority of Chinese Patent Application No. 201810550110.3, filed on May 31, 2018, which is incorporated herein by reference in its entirety for all purposes.

TECHNICAL FIELD

The present disclosure generally relates to computer technology, and in particular to a terminal device, a sensing method, and a sensing apparatus.

BACKGROUND

With rapid development of science and technology, terminal devices (for example, mobile phones) become increasingly popular. Benefiting from various sensing technologies, convenience in the use of the terminal devices is also continuously improving. For example, a fingerprint identification apparatus of the terminal device is capable of sensing fingerprint information of a user, such that various convenient functions such as unlocking and mobile payment may be achieved. Thus, sensing performance of the terminal device needs to be further improved.

SUMMARY

The present disclosure provides a terminal device, a sensing method, and a sensing apparatus.

According to a first aspect of the present disclosure, a terminal device is provided, which includes a plurality of optical sensors and a processor.

The terminal device may comprise a plurality of optical sensors, wherein the plurality of optical sensors are arranged in a plurality of sub-regions, and each of the plurality of sub-regions has a respective optical parameter; and a processor, configured to: control the optical sensor in each sub-region to, upon detecting a target object, sense the target object with a first optical parameter value, and obtain a first sensing signal in each sub-region; determine a target signal range according to the first sensing signal in each sub-region; determine a second optical parameter value with respect to each sub-region according to the first sensing signal in the sub-region and the target signal range; and set the optical parameter of each sub-region to the second optical parameter value.

According to a second aspect of the examples of the present disclosure, a sensing method is provided, which is applicable to a terminal device, wherein the terminal device comprises a plurality of optical sensors, the plurality of optical sensors are arranged in a plurality of sub-regions, and each of the plurality of sub-regions has a respective optical parameter, wherein the method comprises: controlling the optical sensor in each sub-region to, upon detecting a target object, sense the target object with a first optical parameter value to obtain a first sensing signal in each sub-region; determining a target signal range according to the first sensing signal in each sub-region; determining a second optical parameter value with respect to each sub-region according to the first sensing signal in the sub-region and the target signal range; and set the optical parameter of each sub-region to the second optical parameter value.

According to a third aspect of the examples of the present disclosure, a sensing apparatus is provided.

The sensing apparatus may comprise a processor; and a memory configured to store instructions executable by the processor, wherein the processor is configured to execute a sensing method, applicable to a terminal device, wherein the terminal device comprises a plurality of optical sensors, the plurality of optical sensors are arranged in a plurality of sub-regions, and each of the plurality of sub-regions has a respective optical parameter, wherein the method comprises: controlling the optical sensor in each sub-region to, upon detecting a target object, sense the target object with a first optical parameter value to obtain a first sensing signal in each sub-region; determining a target signal range according to the first sensing signal in each sub-region; determining a second optical parameter value with respect to each sub-region according to the first sensing signal in the sub-region and the target signal range; and setting the optical parameter of each sub-region to the second optical parameter value.

According to a fourth aspect of the examples of the present disclosure, a non-transitory computer-readable storage medium is provided, which causes the processor to execute the abovementioned sensing method when the instructions in the storage medium are executed by a processor.

The technical solutions provided by the examples of the present disclosure may have the following beneficial effects. According to the examples of the present disclosure, the optical sensor in each sub-region may be controlled to, upon detecting the target object, sense the target object with the first optical parameter value and obtain the first sensing signal in each sub-region. The target signal range is determined according to the first sensing signal in each sub-region. The second optical parameter value with respect to each sub-region is determined according to the first sensing signal in each sub-region and the target signal range. The optical parameter of each sub-region is set to the second optical parameter value. The value of the optical parameter of each sub-region is adjusted, thereby improving the sensing performance in each sub-region to improve the sensing performance of the terminal device.

It is to be understood that, the above general description and detailed description below are only exemplary and explanatory and do not limit the present disclosure.

BRIEF DESCRIPTION OF THE DRAWINGS

The accompanying drawings here are incorporated into the specification and constitute a part of this specification. The accompanying drawings illustrate examples of the present disclosure, and serve to explain the principles of the present disclosure together with the description.

DETAILED DESCRIPTION

When the following description refers to the accompanying drawings, the same numerals in different drawings represent the same or similar elements unless indicated otherwise. The implementations described in the following exemplary examples do not represent all implementations consistent with the present disclosure. Instead, they are merely examples of the apparatuses and methods consistent with aspects of the present disclosure.

The terminology used in the present disclosure is for the purpose of describing particular examples only and is not intended to limit the present disclosure. As used in this disclosure and the appended claims, the singular forms "a", "an", and "the" are intended to include the plural forms as well, unless the context clearly indicates otherwise. It should also be understood that the term "and/or" as used herein refers to and includes any and all possible combinations of one or more of the associated listed items.

It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Figure 1:
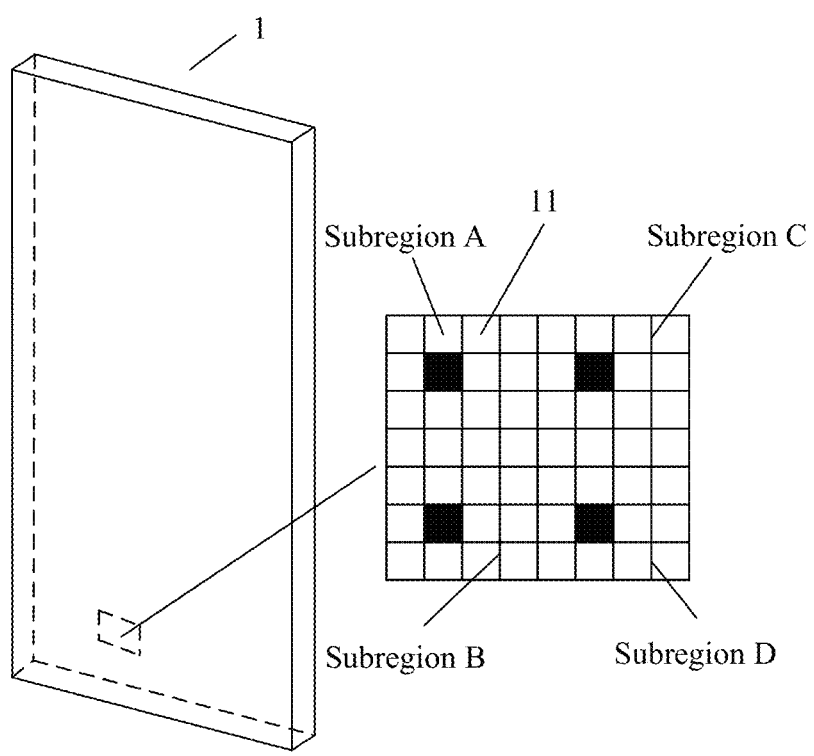
FIG. 1 is a schematic diagram illustrating a terminal device according to an exemplary example.

FIG. 1 is a schematic diagram illustrating a terminal device according to an exemplary example. As illustrated in FIG. 1, the terminal device 1 includes multiple optical sensors 11 and a processor.

The multiple optical sensors 11 may be arranged in multiple sub-regions, and each of the multiple sub-regions may have a respective optical parameter.

The processor may be configured to:

control the optical sensor 11 in each sub-region to, upon detecting a target object, sense the target object with a first optical parameter value and obtain a first sensing signal in each sub-region;

determine a target signal range according to the first sensing signal in each sub-region;

determine a second optical parameter value with respect to each sub-region according to the first sensing signal in the sub-region and the target signal range; and set the optical parameter of each sub-region to the second optical parameter value.

According to an example of the present disclosure, the value of the optical parameter of each sub-region may be adjusted to be the second optical parameter value, thereby improving the sensing performance in each sub-region, and improving the sensing performance of the terminal device.

In an exemplary application scenario, when a user expects to perform fingerprint identification, and the terminal device, upon detecting the target object (for example, a finger of the user), may control the optical sensor in each sub-region to perform sensing for many times (for example, perform sensing twice). For example, first sensing is performed with the default first optical parameter value of each sub-region, and the first sensing signal in each sub-region is obtained. The terminal device may determine the target signal range according to the first sensing signal in each sub-region, determine the second optical parameter value with respect to each sub-region according to the first sensing signal in the sub-region and the target signal range, and set the value of the optical parameter of each sub-region to the second optical parameter value. After the value of the optical parameter is adjusted in this way, the sensing performance in each sub-region is improved to improve subsequent sensing performance of the terminal device.

For example, when the terminal device controls the optical sensor in each sub-region to perform second sensing with the adjusted second optical parameter value, each obtained second sensing signal is an effective signal which is within the target signal range and tends to be consistent and is less likely to be oversaturated or underexposure. Each second sensing signal may be further optimized and calculated by a back-end processing circuit to perform fingerprint identification. It is to be understood that, each second sensing signal is effective signal which tends to be consistent and less likely to be oversaturated or underexposure, thereby improving a signal-to-noise ratio, improving the sensing performance of the terminal device and improving accuracy of fingerprint identification.

In a possible implementation, the terminal device may be any device, such as a mobile phone and a tablet computer. The multiple optical sensors of the terminal device may be optical sensors in various apparatuses configured to convert a luminous intensity into an electrical signal and implement sensing and identification. Description will be made herein by taking an example, in which the terminal device is a mobile phone and the multiple optical sensors are optical sensors in a fingerprint identification apparatus.

For example, the terminal device may include multiple optical sensors (for example, multiple photodiodes). The multiple optical sensors may be located at any position of the terminal device. For example, they may be located at a front display screen of the mobile phone, a rear cover on a back surface of the mobile phone, below the display screen of the mobile phone or the like. When the multiple optical sensors are located below the display screen of the terminal device, a region above the multiple optical sensors may be a self-luminescent display region on which light may penetrate the display screen. The light emitted from the display region is reflected by the target object, and the reflected light is converted into an electrical signal by the multiple optical sensors. The electrical signal is further optimized and calculated by the back-end processing circuit to implement in-screen fingerprint identification. For example, the multiple optical sensors may be located below an OLED display region of the display screen of the terminal device. The OLED display region is made of OLEDs, and has the characteristics such as self-luminescence and light being capable of penetrating the display screen, to implement in-screen fingerprint identification.

The multiple optical sensors are arranged in multiple sub-regions, and each of the multiple sub-regions has a respective optical parameter. For example, as illustrated in FIG. 1, the multiple optical sensors 11 (7×8 optical sensors in FIG. 1) are arranged in four sub-regions: a sub-region A, a sub-region B, a sub-region C and a sub-region D. Each of the sub-region A, the sub-region B, the sub-region C and the sub-region D has a respective optical parameter. The optical parameter may be any parameter related to the sub-region. For example, the optical parameter may be an exposure parameter of the optical sensor in each sub-region, or may be a luminous intensity of a corresponding sub-region of the display screen, and the like. The exposure parameter of the optical sensor may include any parameter related to exposure of the optical sensor, for example, may include at least one of an exposure time or the number of exposures per unit time, or the like. The types of the optical parameter and types of the exposure parameter of the optical sensor are not limited in the present disclosure.

The terminal device may further include a processor. The processor may be configured to:

control the optical sensor in each sub-region to, upon detecting the target object, sense the target object with the first optical parameter value to obtain the first sensing signal in each sub-region;

determine a target signal range according to the first sensing signal in each sub-region;

determine a second optical parameter value with respect to each sub-region according to the first sensing signal in the sub-region and the target signal range; and set an optical parameter of each sub-region to the second optical parameter value.

For example, the processor of the terminal device can control the optical sensor in each sub-region to, upon detecting the target object, sense the target object with the first optical parameter value and obtain the first sensing signal in each sub-region.

The first optical parameter value may be a current optical parameter value of each sub-region when the optical sensor of the terminal device detects the target object. The first optical parameter value may be a preset value of the optical parameter of each sub-region, and may also be a value of the optical parameter of each sub-region, which is automatically stored and used last time. The first optical parameter value of each sub-region may be the same (for example, the same optical parameter value is used by each sub-region), and the first optical parameter value of each sub-region may also not be exactly the same. There is no limit thereto in the present disclosure.

In a possible implementation, the processor of the terminal device may be a processor of a fingerprint identification apparatus of a terminal device. For example, the fingerprint identification apparatus may include multiple optical sensors and a processor. The processor may control the optical sensor in each sub-region to, upon detecting the target object, sense the target object with the first optical parameter value and obtain a first sensing signal in each sub-region. In the present disclosure, there is no limit to a manner in which the processor of the terminal device controls the optical sensor in each sub-region to, upon detecting the target object, sense the target object with the first optical parameter value and obtain the first sensing signal in each sub-region.

In a possible implementation, the processor of the terminal device may control one or more optical sensors in each sub-region to sense the target object with the first optical parameter value, and determine a signal sensed by an optical sensor in each sub-region or a mean value of signals sensed by multiple optical sensors as the first sensing signal in each sub-region.

For example, as illustrated in FIG. 1, the processor of the terminal device may control an optical sensor in each sub-region (four optical sensors highlighted in black in FIG. 1 are optical sensors in the four sub-regions respectively) to sense the target object with the first optical parameter value, for example, four signals are obtained. A signal sensed by the optical sensor in each sub-region may be determined as the first sensing signal in each sub-region. Therefore, an efficiency of sensing the target object with the first optical parameter value can be improved. A number, a position and the like of the optical sensor controlled by the processor of the terminal device in each sub-region to sense the target object with the first optical parameter value are not limited in the present disclosure.

Figure 2A:
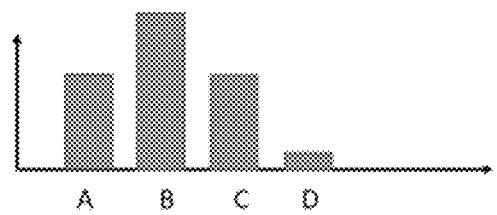
FIG. 2A is a schematic diagram illustrating a first sensing signal in each sub-region of a terminal device according to an exemplary example.

FIG. 2A is a schematic diagram illustrating a first sensing signal in each sub-region of a terminal device according to an exemplary example. In a possible implementation, a user covers the fingerprint identification apparatus (the fingerprint identification apparatus may be located at a display screen of a mobile phone, a rear cover on a back surface of the mobile phone, or below the display screen of the mobile phone) with a finger. A processor of the fingerprint identification apparatus may control the optical sensor in each sub-region to, upon detecting the target object, sense the target object with the first optical parameter value and obtain the first sensing signal in each sub-region. For example, as illustrated in FIG. 2A, the first sensing signals in the four sub-regions are obtained. For various possible reasons such as uneven ambient illumination, the first sensing signal in the sub-region B has a high intensity (for example, the signal is in an oversaturated state), and the first sensing signal in the sub-region D has a low intensity (for example, the signal is in an underexposure state). It is to be understood that, signal being oversaturated or signal being underexposure may influence optimization and calculation by a back-end processing circuit and may reduce accuracy of fingerprint identification.

The processor of the terminal device can determine a target signal range according to the first sensing signal in each sub-region. The target signal range may be a signal range within which the sensing signal sensed in each sub-region is expected to be.

For example, the processor of the terminal device may add values of the first sensing signals in the sub-regions to calculate a mean value, and determine the target signal range according to the mean value of the first sensing signals in the sub-regions. For example, when the mean value of the first sensing signals in the four sub-regions is 300 signal units, the target signal range may be determined to be a range from 250 signal units to 350 signal units. When the mean value of the first sensing signals in the four sub-regions is 1,000 signal units, the target signal range may be determined to be a range from 950 signal units to 1,050 signal units. The processor may also calculate a weighted sum of the first sensing signals in the sub-regions and determine the target signal range according to a ratio of the weighted sum to a sum of the first sensing signals in the sub-regions. Alternatively, the processor may also determine the target signal range according to an intermediate value of the first sensing signals in the sub-regions. A manner of determining the target signal range according to the first sensing signal in each sub-region is not limited in the present disclosure.

The processor of the terminal device is capable of determining the second optical parameter value with respect to each sub-region according to the first sensing signal in the sub-region and the target signal range, and set an optical parameter of each sub-region to the second optical parameter value.

For example, the processor of the terminal device may calculate and determine the second optical parameter value with respect to each sub-region according to the first sensing signal in the sub-region and the target signal range, and may set the value of the optical parameter of each sub-region to the second optical parameter value, so that each second sensing signal within the target signal range can be obtained when the optical sensor in each sub-region senses the target object with the second optical parameter value. As described above, the first optical parameter values of the sub-regions may be different. The processor of the terminal device, when calculating and determining the second optical parameter value with respect to each sub-region according to the first sensing signal in the sub-region and the target signal range, may determine the second optical parameter value with respect to each sub-region on the basis of the first optical parameter value of each sub-region. For example, when the first optical parameter value of a certain sub-region includes an exposure time 1, the determined second optical parameter value of this sub-region may include an exposure time which is an increase or a decrease of the exposure time 1.

It is to be understood that, the optical parameter of each sub-region has various forms. The processor of the terminal device may determine the second optical parameter value with respect to each sub-region in various manners according to the first sensing signal in each sub-region and the target signal range, and set the optical parameter of each sub-region to the second optical parameter value, as long as the second sensing signal within the target signal range may be obtained when the optical sensor in each sub-region senses the target object with the second optical parameter value. In the present disclosure, there is no limit to a manner in which the processor of the terminal device determines the second optical parameter value with respect to each sub-region according to the first sensing signal in each sub-region and the target signal range and sets the value of the optical parameter of each sub-region to the second optical parameter value.

In a possible implementation, a processor of a fingerprint identification apparatus of the terminal device may determine the second optical parameter value with respect to each sub-region according to the first sensing signal in the sub-region and the target signal range, and set the value of the optical parameter of each sub-region to the second optical parameter value.

For example, when the value of the first sensing signal in the sub-region A is 340 signal units, the value of the first sensing signal in the sub-region B is 450 signal units, the value of the first sensing signal in the sub-region C is 350 signal units and the value of the first sensing signal in the sub-region D is 60 signal units, the determined target signal range is a range from 250 signal units to 350 signal units. For example, the value of the first sensing signal in the sub-region B is 450 signal units (the first sensing signal is not within the target signal range and is greater than an upper limit of the target signal range). The processor of the fingerprint identification apparatus may determine the second optical parameter value with respect to the sub-region B according to the first sensing signal (for example, 450 signal units) in the sub-region B and the target signal range (for example, a range from 250 signal units to 350 signal units), and set the optical parameter of the sub-region B to the second optical parameter value. For example, on the basis of the first optical parameter value of the sub-region B, an exposure time of the sub-region B is decreased, the number of exposures per unit time of the sub-region B is decreased, or the exposure time of the sub-region B is decreased while the number of exposures per unit time of the sub-region B is decreased, and the like.

The value of the first sensing signal in the sub-region D is 60 signal units (the first sensing signal is not within the target signal range and is less than a lower limit of the target signal range). The processor of the fingerprint identification apparatus may determine the second optical parameter value with respect to the sub-region D according to the first sensing signal (for example, 60 signal units) in the sub-region D and the target signal range (for example, a range from 250 signal units to 350 signal units), and set the optical parameter of the sub-region D. For example, on the basis of the first optical parameter value of the sub-region D, an exposure time of the sub-region D is increased, the number of exposures per unit time of the sub-region D is increased, or the exposure time of the sub-region D is increased while the number of exposures per unit time of the sub-region D is increased, and the like.

The first sensing signals in the sub-region A and the sub-region C are both within the target signal range. Therefore, the processor may determine that the second optical parameter values with respect to the sub-region A and the sub-region C are kept to be the respective first optical parameter values. The first optical parameter values of the sub-region A and the sub-region C may also be fine-tuned, and the fine-tuned optical parameter values are determined as the second optical parameter values of the sub-region A and the sub-region C. For example, the first sensing signals in the sub-region A and the sub-region C (for example, 340 signal units and 350 signal units respectively) are both within the target signal range (for example, a range from 250 signal units to 350 signal units) and are close to an upper limit of the range. Then, on the basis of the first optical parameter values of the sub-region A and the sub-region C, exposure time of the sub-region A and the sub-region C are properly decreased, the numbers of exposures per unit time of the sub-region A and the sub-region C are decreased, or the exposure time of the sub-region A and the sub-region C are decreased while the numbers of exposures per unit time of the sub-region A and the sub-region C are simultaneously decreased, or the like.

In a possible implementation, the processor of the terminal device (for example, a processor of a mobile phone) may determine the second optical parameter value with respect to each sub-region according to the first sensing signal in the sub-region and the target signal range, and set an optical parameter of each sub-region to the second optical parameter value.

For example, the processor of the terminal device may also calculate and determine the second optical parameter value with respect to each sub-region according to the first sensing signal in the sub-region and the target signal range, and set the value of the optical parameter (for example, a luminous intensity of a corresponding sub-region of the display screen) of each sub-region to the second optical parameter value. For example, a display screen of the terminal device includes an OLED display region including multiple sub-regions, and multiple optical sensors are located below the OLED display region. The OLED display region is self-luminescent. The processor of the terminal device may calculate and determine the second optical parameter value (for example, a target luminous intensity of the OLED display screen) with respect to each sub-region according to the first sensing signal in the sub-region and the target signal range, and set the luminous intensity of the corresponding OLED display region to the calculated target luminous intensity.

It is to be noted that, the more light emitting pixels exist in the same row or column of the OLED display region, the higher luminous intensity is generated. When the light intensities of the OLED display regions corresponding to a part of sub-regions are decreased, luminous intensities of the OLED display regions corresponding to the other sub-regions may be increased. The processor of the terminal device may calculate and obtain a method for adjusting the value of the optical parameter of each sub-region according to the first sensing signal in each sub-region and the target signal range. According to the method, the luminous intensities of the OLED display regions corresponding to a part of sub-regions are decreased, and the luminous intensities of the OLED display regions corresponding to the other sub-regions are increased. Moreover, an obtained second sensing signal is within the target signal range when the optical sensor in each sub-region senses the objects to be detected with the adjusted second optical parameter values. For example, the luminous intensities of the sub-region A, the sub-region B and the sub-region C of the display screen are decreased, and the luminous intensity of the sub-region D of the display screen is increased.

It is to be understood that, the operation that the processor of the terminal device determines the second optical parameter value with respect to each sub-region according to the first sensing signal in each sub-region and the target signal range and sets the value of the optical parameter of each sub-region to the second optical parameter value may be one of the following operations. The processor of the fingerprint identification apparatus of the terminal device adjusts an exposure time and the number of exposures per unit time of each sub-region according to the first sensing signal in each sub-region and the target signal range; the processor of the terminal device adjusts the luminous intensity of a corresponding sub-region of the display screen according to the first sensing signal in each sub-region and the target signal range; or, the processor of the fingerprint identification apparatus of the terminal device adjusts the exposure time and the number of exposures per unit time of each sub-region according to the first sensing signal in each sub-region and the target signal range and adjusts the luminous intensity of a corresponding sub-region of the display screen according to the first sensing signal in each sub-region and the target signal range, as long as the processor of the terminal device determines the second optical parameter value with respect to each sub-region according to the first sensing signal in the sub-region and the target signal range and sets the value of the optical parameter of each sub-region to the second optical parameter value so that it can be achieved that the second sensing signal obtained by controlling each sub-region to sense the target object with the second optical parameter value is within the target signal range. There is no limit thereto in the present disclosure.

In one example, the processor of the terminal device may be configured to:

control each sub-region to sense the target object with the second optical parameter value and obtain a second sensing signal in each sub-region;

determine whether the second sensing signal in each sub-region is within the target signal range; and when the second sensing signal in each sub-region is not within the target signal range, continue adjusting the value of the optical parameter of each sub-region according to the second sensing signal in each sub-region and the target signal range.

For example, the processor of the terminal device (for example, a processor of a fingerprint identification apparatus of the terminal device) may control each sub-region to sense the target object with the second optical parameter value and obtain the second sensing signal in each sub-region, and may determine whether the second sensing signal in each sub-region is within the target signal range. When the second sensing signal in each sub-region is within the target signal range, each second sensing signal may be optimized and calculated by a back-end processing circuit to determine a result of fingerprint identification.

When the second sensing signal in each sub-region is not within the target signal range, an optical parameter of each sub-region may be continued to be adjusted according to the second sensing signal in each sub-region and the target signal range. For example, as described above, a third optical parameter value with respect to each sub-region may be determined according to the second sensing signal in the sub-region and the target signal range, and the value of the optical parameter of each sub-region is adjusted to be the third optical parameter value. It is to be understood that by adjusting the value of the optical parameter of each sub-region, it can finally be achieved that the target object is sensed with the adjusted optical parameter value (for example, an Nth optical parameter value) and an obtained Nth sensing signal in each sub-region is within the target signal range. The Nth sensing signal may be optimized and calculated by a back-end processing circuit to determine a result of fingerprint identification. The times and the manner of adjusting the value of the optical parameter of each sub-region are not limited in the present disclosure.

Figure 2B:
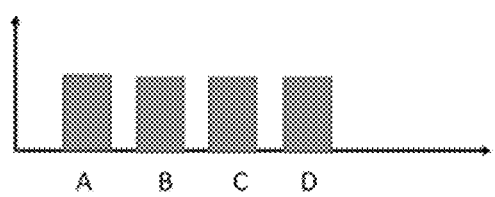
FIG. 2B is a schematic diagram illustrating a second sensing signal in each sub-region of a terminal device according to an exemplary example.

FIG. 2B is a schematic diagram illustrating a second sensing signal in each sub-region of a terminal device according to an exemplary example. In a possible implementation, as illustrated in FIG. 2B, the processor of the terminal device controls each sub-region to sense the target object with the adjusted optical parameter value (for example, the second optical parameter value) and the second sensing signal so obtained in each sub-region which tends to be consistent and within the target signal range. Each second sensing signal may be further optimized and calculated by a back-end processing circuit for fingerprint identification. It is to be understood that, each second sensing signal is an effective signal which tends to be consistent and less likely to be oversaturated or underexposure, thereby improving a signal-to-noise ratio, improving the sensing performance of the terminal device so as to improve accuracy of the fingerprint identification.

Figure 3:
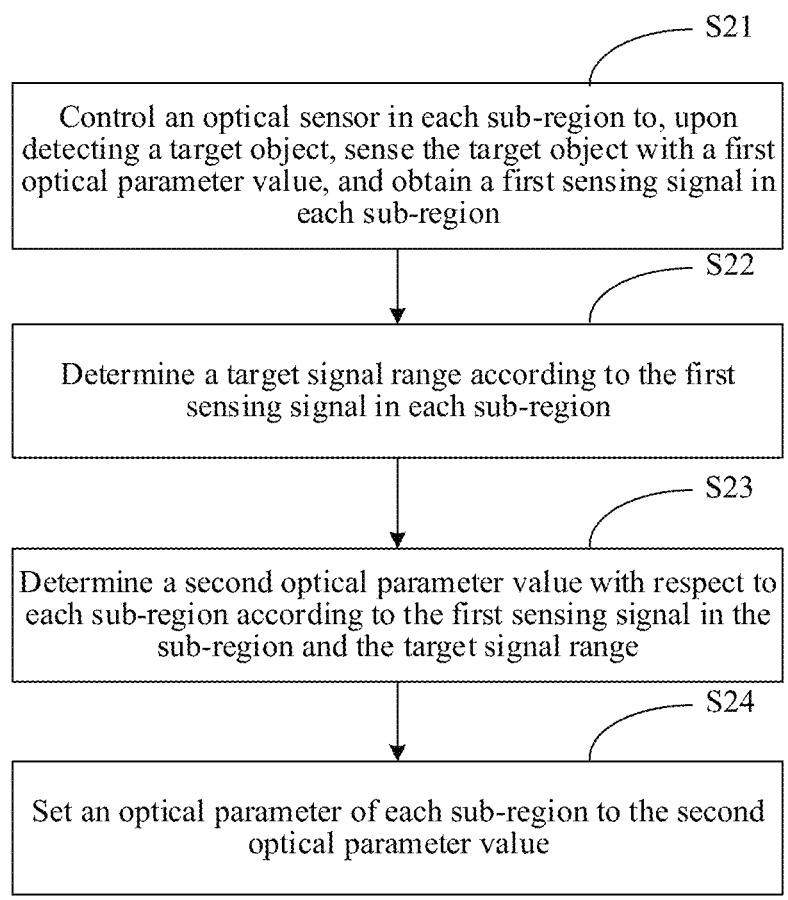
FIG. 3 is a flow chart illustrating a sensing method according to an exemplary example.

FIG. 3 is a flow chart illustrating a sensing method according to an exemplary example. As illustrated in FIG. 3, the method is applicable to a terminal device, such as a mobile phone and a tablet computer. The terminal device includes multiple optical sensors. The multiple optical sensors are arranged in multiple sub-regions. Each of the multiple sub-regions has a respective optical parameter. The sensing method according to an example of the present disclosure includes the following operations.

In S21, the optical sensor in each sub-region is controlled to, upon detecting a target object, sense the target object with a first optical parameter value and obtain a first sensing signal in each sub-region.

In S22, a target signal range is determined according to the first sensing signal in each sub-region.

In S23, a second optical parameter value with respect to each sub-region is determined according to the first sensing signal in the sub-region and the target signal range.

In S24, the optical parameter of each sub-region is adjusted to be the second optical parameter value.

According to an example of the present disclosure, the optical sensor in each sub-region can be controlled to, upon detecting the target object, sense the target object with the first optical parameter value, and obtain the first sensing signal in each sub-region. The target signal range is determined according to the first sensing signal in each sub-region. The second optical parameter value with respect to each sub-region is determined according to the first sensing signal in the sub-region and the target signal range, and the value of the optical parameter of each sub-region is set to the second optical parameter value.

In this way, the value of the optical parameter of each sub-region is adjusted, thereby the sensing performance in each sub-region can be improved, so that each sub-region senses the target object with the second optical parameter value, and each second sensing signal can be obtained, which is within the target signal range and tends to be consistent. Occurrence of the second sensing signal being oversaturated or underexposure is reduced, and the sensing performance is improved.

In a possible implementation, the sensing method according to an example of the present disclosure may be applicable to the terminal device as described above.

The optical parameter may include an exposure parameter of the optical sensor in each sub-region, a luminous intensity of a corresponding sub-region of a display screen, and the like. The exposure parameter may include at least one of an exposure time or the number of exposures per unit time. The display screen of the terminal device may include an OLED display region including multiple sub-regions, and the optical sensors are arranged below the OLED display region. As described above, no more description will be made herein.

Figure 4:
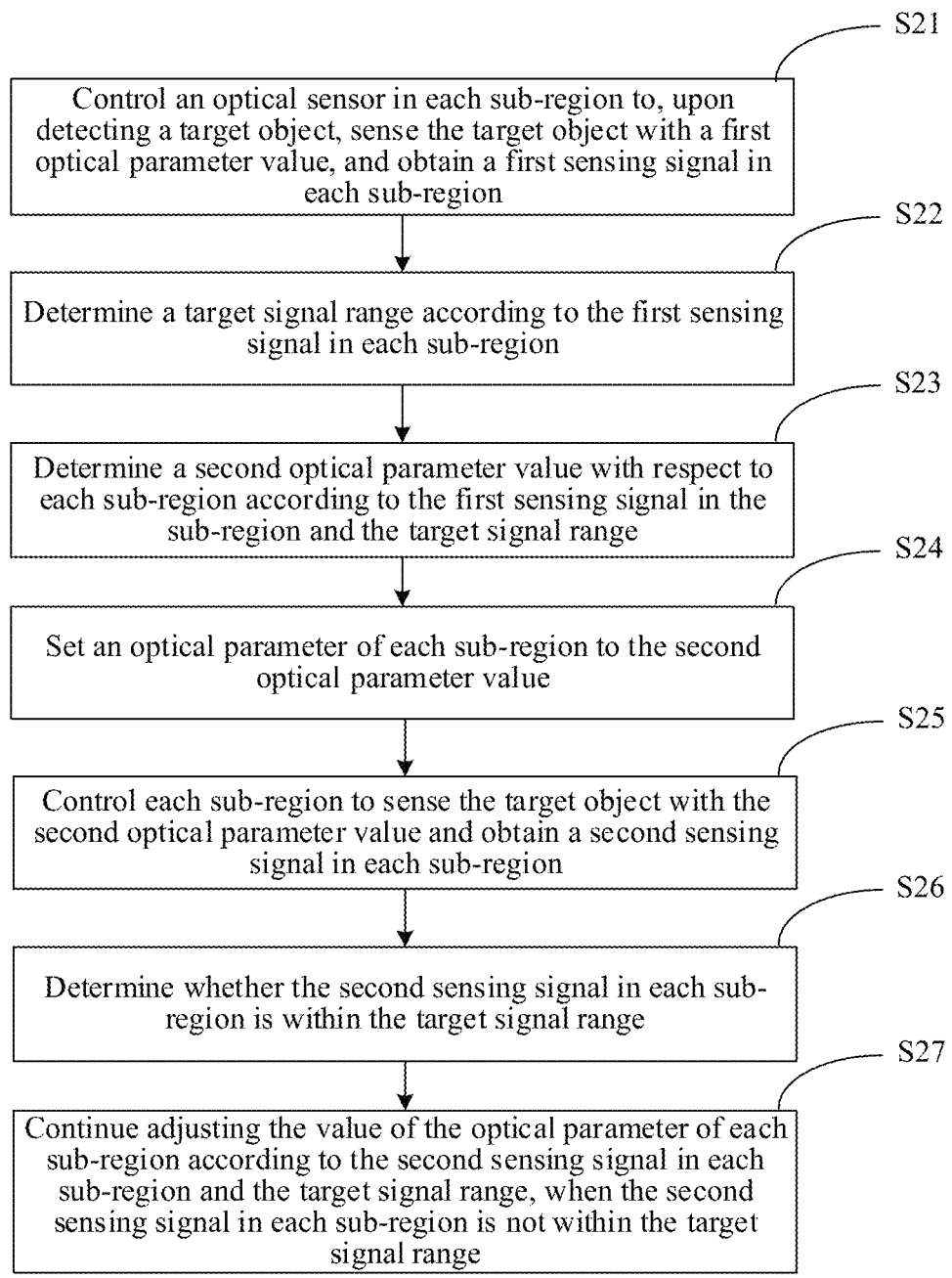
FIG. 4 is a flow chart illustrating a sensing method according to an exemplary example.

FIG. 4 is a flow chart illustrating a sensing method according to an exemplary example. In a possible implementation, as shown in FIG. 4, the method further includes the following operations.

In S25, each sub-region is controlled to sense the target object with the second optical parameter value, and obtain a second sensing signal in each sub-region.

In S26, it is determined whether the second sensing signal in each sub-region is within the target signal range.

In S27, when the second sensing signal in each sub-region is not within the target signal range, the value of the optical parameter of each sub-region is continued to be adjusted according to the second sensing signal in each sub-region and the target signal range.

Example of Application

The application example according to an example of the present disclosure will be given below in conjunction with an exemplary application scenario of "a user performing mobile fingerprint identification" to make the flow of the sensing method convenient to understand. Those skilled in the art should understand that, the following application example is only intended to make an example of the present disclosure convenient to understand and should not be considered as a limit to the present disclosure.

Figure 5A:
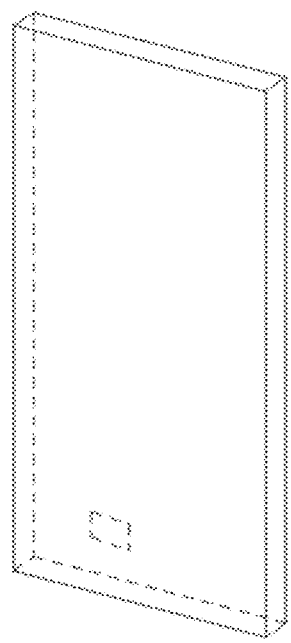
FIG. 5A and FIG. 5B are schematic diagrams illustrating an application scenario of a sensing method according to an exemplary example.
Figure 5B:
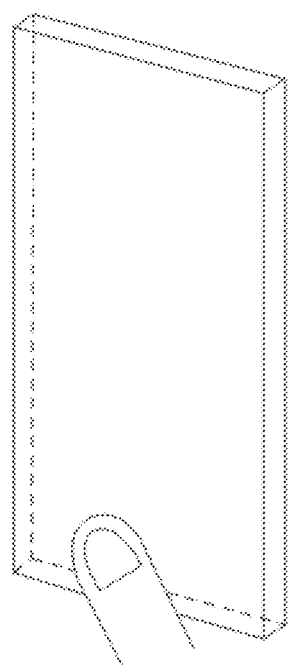

FIG. 5A and FIG. 5B are schematic diagrams illustrating an application scenario of a sensing method according to an exemplary example. In the application example, as illustrated in FIG. 5A, a mobile phone of a user is a full-screen mobile phone. The mobile phone includes a fingerprint identification apparatus. The fingerprint identification apparatus is a fingerprint identification apparatus located below a display screen of the mobile phone. For example, the display screen of the mobile phone includes an OLED display region including multiple sub-regions. Multiple optical sensors of the fingerprint identification apparatus are arranged below the OLED display region. The multiple optical sensors are arranged in multiple sub-regions. Each of the multiple sub-regions has a respective optical parameter.

In the application example, the user expects to perform fingerprint identification for mobile payment. As illustrated in FIG. 5B, the user may press a region corresponding to the fingerprint identification apparatus on the display screen of the mobile phone with a finger.

In the application example, the mobile phone controls the optical sensor in each sub-region to, upon detecting a target object, sense the target object with a first optical parameter value, and obtain a first sensing signal in each sub-region. A target signal range is determined according to a mean value of the first sensing signals in the sub-regions. A second optical parameter value with respect to each sub-region is determined according to the first sensing signal in the sub-region and the target signal range. The value of the optical parameter of each sub-region is set to the second optical parameter value. For example, for a sub-region in which the first sensing signal has excessively high signal intensity, an exposure time of the sub-region is decreased. For a sub-region in which the first sensing signal has excessively low signal intensity, an exposure time of the sub-region is increased. The mobile phone controls each sub-region to sense the target object with the second optical parameter value, and obtain a second sensing signal. It is determined whether the second sensing signal in each sub-region is within the target signal range. When each second sensing signal is within the target signal range, each second sensing signal may further be optimized and calculated by a back-end processing circuit to perform fingerprint identification authentication. For example, when authentication succeeds, a corresponding operation of mobile payment is performed on the mobile phone.

In the application example, when each second sensing signal is not within the target signal range, the mobile phone may continue adjusting the value of the optical parameter of each sub-region according to the second sensing signal in each sub-region and the target signal range, until the mobile phone controls each sub-region to sense the target object with the adjusted optical parameter value and an obtained sensing signal is within the target signal range. These signals may be optimized and calculated by a back-end circuit to perform fingerprint identification authentication.

Figure 6:
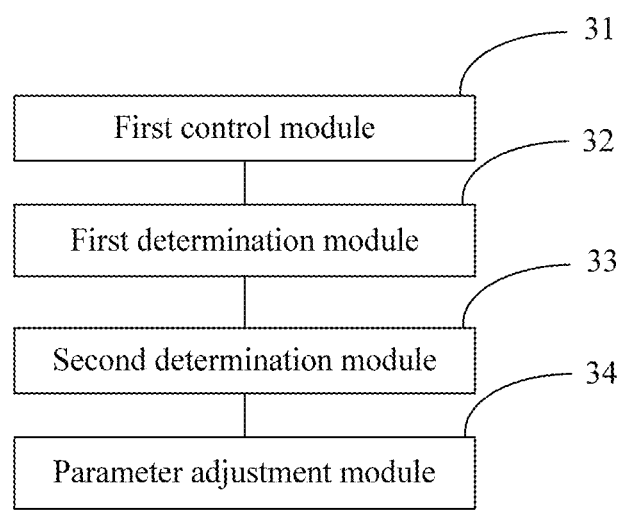
FIG. 6 is a block diagram illustrating a sensing apparatus according to an exemplary example.

FIG. 6 is a block diagram illustrating a sensing apparatus according to an exemplary example. The apparatus is applicable to a terminal device. The terminal device includes multiple optical sensors. The multiple optical sensors are arranged in multiple sub-regions. Each of the multiple sub-regions has a respective optical parameter. Referring to FIG. 6, the apparatus includes a first control module 31, a first determination module 32, a second determination module 33 and a parameter adjustment module 34.

The first control module 31 is configured to control the optical sensor in each sub-region to, upon detecting a target object, sense the target object with a first optical parameter value, and obtain a first sensing signal in each sub-region.

The first determination module 32 is configured to determine a target signal range according to the first sensing signal in each sub-region.

The second determination module 33 is configured to determine a second optical parameter value with respect to each sub-region according to the first sensing signal in the sub-region and the target signal range.

The parameter adjustment module 34 is configured to set the optical parameter of each sub-region to the second optical parameter value.

Figure 7:
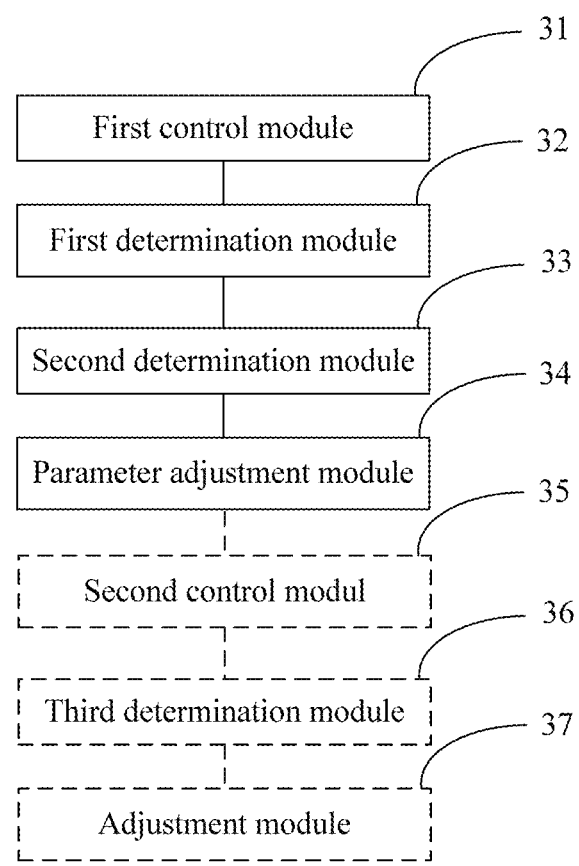
FIG. 7 is a block diagram illustrating a sensing apparatus according to an exemplary example.

FIG. 7 is a block diagram illustrating a sensing apparatus according to an exemplary example. In a possible implementation, referring to FIG. 7, the apparatus further includes a second control module 35, a third determination module 36 and an adjustment module 37.

The second control module 35 is configured to control each sub-region to sense the target object with the second optical parameter value and obtain a second sensing signal in each sub-region.

The third determination module 36 is configured to determine whether the second sensing signal in each sub-region is within the target signal range.

The adjustment module 37 is configured to, when the second sensing signal in each sub-region is not within the target signal range, continue adjusting the value of the optical parameter of each sub-region according to the second sensing signal in each sub-region and the target signal range.

In a possible implementation, the optical parameter may include an exposure parameter of the optical sensor in each sub-region.

In a possible implementation, the exposure parameter may include at least one of an exposure time or the number of exposures per unit time.

In a possible implementation, the optical parameter may include a luminous intensity of a corresponding sub-region of a display screen.

In a possible implementation, the display screen may include an OLED display region including multiple sub-region, and the optical sensors are arranged below the OLED display region.

With respect to the apparatus in the above examples, the specific manner for performing operations for the modules of the apparatus have been described in detail in the example regarding the method, which will not be described in detail herein.

Figure 8:
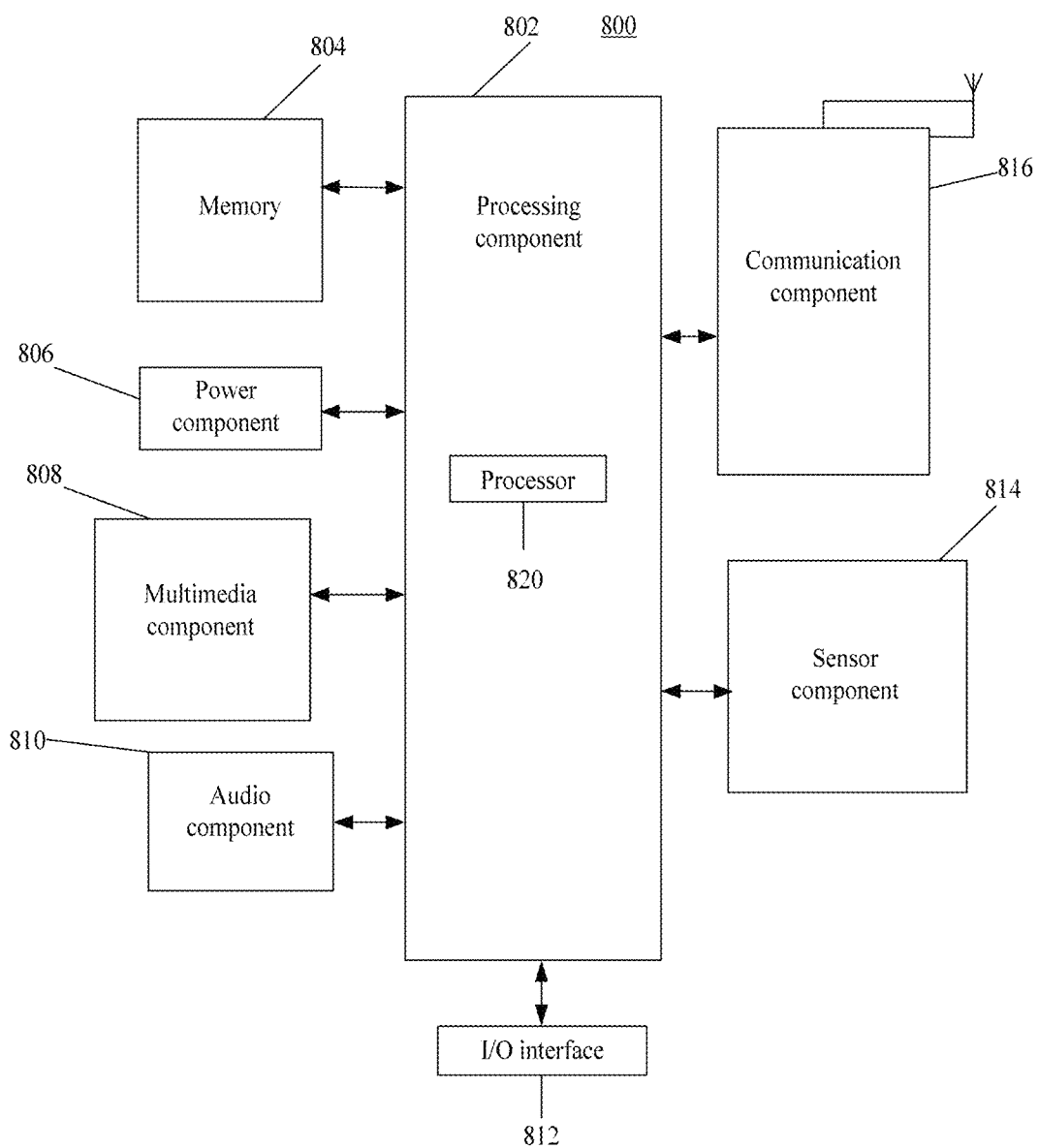
FIG. 8 is a block diagram illustrating a sensing apparatus according to an exemplary example.

FIG. 8 is a block diagram illustrating a sensing apparatus according to an exemplary example. For example, the apparatus 800 may be a mobile phone, a computer, a digital broadcast terminal, a messaging device, a game console, a tablet device, a medical device, an exercise device, a personal digital assistant and the like.

Referring to FIG. 8, the apparatus 800 may include one or more of the following components: a processor, or processing component, 802, a memory 804, a power component 806, a multimedia component 808, an audio component 810, an Input/Output (I/O) interface 812, a sensor component 814, and a communication component 816.

The processor 802 typically controls overall operations of the apparatus 800, such as operations associated with display, a telephone call, data communication, a camera operation, and a recording operation. The processor 802 may include one or more processors 820 to execute instructions to perform all or part of the steps in the abovementioned method. Moreover, the processor 802 may include one or more modules which facilitate interactions between the processor 802 and the other components. For example, the processor 802 may include a multimedia module to facilitate an interaction between the multimedia component 808 and the processor 802.

The memory 804 is configured to store various types of data to support the operation of the apparatus 800. Examples of such data include instructions for any application program or method operated on the apparatus 800, contact data, phonebook data, messages, pictures, videos, and the like. The memory 804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or an optical disk.

The power component 806 provides power for various components of the apparatus 800. The power component 806 may include a power management system, one or more power supplies, and other components associated with generation, management and power distribution for the apparatus 800.

The multimedia component 808 includes a screen providing an output interface between the apparatus 800 and a user. In some examples, the screen may include a Liquid Crystal Display (LCD) and a Touch Panel (TP). When the screen includes the TP, the screen may be implemented as a touch screen to receive an input signal from the user. The TP includes one or more touch sensors to sense touch, sliding and gestures on the TP. The touch sensor may not only sense a boundary of touch or a sliding action but also detect duration and a pressure associated with the touch or sliding operation. In some examples, the multimedia component 808 includes a front camera and/or a rear camera. The front camera and/or the rear camera may receive external multimedia data when the apparatus 800 is in an operation mode, such as a photographing mode or a video mode. Each of the front camera and the rear camera may be a fixed optical lens system or may have zoom and optical zoom capabilities.

The audio component 810 is configured to output and/or input an audio signal. For example, the audio component 810 includes a Microphone (MIC). The MIC is configured to receive an external audio signal when the apparatus 800 is in an operation mode, such as a call mode, a recording mode and a speech recognition mode. The received audio signal may further be stored in the memory 804 or sent via the communication component 816. In some examples, the audio component 810 further includes a speaker configured to output the audio signal.

The I/O interface 812 provides an interface between the processor 802 and a peripheral interface module. The above-described peripheral interface module may be a keyboard, a click wheel, a button or the like. The button may include but is not limited to: a home button, a volume button, a start button and a locking button.

The sensor component 814 includes one or more sensors configured to provide status for the apparatus 800 in various aspects. For example, the sensor component 814 may detect an on/off status of the apparatus 800 and relative positioning of components. For example, the components are a display and a small keyboard of the apparatus 800. The sensor component 814 may further detect a change in a position of the apparatus 800 or a component of the apparatus 800, presence or absence of contact between the user and the apparatus 800, an orientation or acceleration/deceleration of the apparatus 800 and a change in a temperature of the apparatus 800. The sensor component 814 may include a proximity sensor configured to detect presence of a nearby object without any physical contact. The sensor component 814 may also include a light sensor, such as a Complementary Metal Oxide Semiconductor (CMOS) or Charge Coupled Device (CCD) image sensor, for use in an imaging application. In some examples, the sensor component 814 may further include an acceleration sensor, a gyroscope sensor, a magnetic sensor, a pressure sensor or a temperature sensor.

The communication component 816 is configured to perform wired or wireless communication between the apparatus 800 and other devices. The apparatus 800 may access to a wireless network based on a communication standard, such as a Wireless Fidelity (WiFi) network, a 2nd-Generation (2G) or 3rd-Generation (3G) network, or a combination thereof. In an exemplary example, the communication component 816 receives a broadcast signal or broadcast related information from an external broadcast management system via a broadcast channel. In an exemplary example, the communication component 816 further includes a Near Field Communication (NFC) module to perform short-range communication. For example, the NFC module may be implemented on the basis of Radio Frequency Identification (RFID) technology, Infrared Data Association (IrDA) technology, Ultra-WideBand (UWB) technology, Bluetooth (BT) technology and other technologies.

In an exemplary example, the apparatus 800 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components to execute the abovementioned method.

In an exemplary example, it is further provided a non-transitory computer-readable storage medium including instructions, such as the memory 804 including instructions, and the instructions may be executed by the processor 820 of the apparatus 800 to execute the abovementioned method. For example, the non-transitory computer-readable storage medium may be a ROM, a Random Access Memory (RAM), a Compact Disc Read-Only Memory (CD-ROM), a magnetic tape, a floppy disc, optical data storage device and the like.

The terminal device may include a sensing surface, and the plurality of optical sensors may be arranged in sub-regions of the sensing surface. In some examples, the sensing surface may be a display screen or a sensing area of the display screen. The optical sensors may be arranged in sub-regions of a display area, or a non-display area, of the display screen. In some other examples, the sensing surface may be separate from the display screen, and the optical sensors may be arranged in sub-regions of the sensing surface.

In some examples, the processor may be the central processor of the terminal device, which is shared with other functionality of the terminal device. Alternatively, the processor may also be a microcontroller, or a separate processor with limited functionality. The microcontroller or processor may be a specifically designed IC chip for controlling the optical sensors.

In some examples, each sub-region may include a plurality of physical sensors. Each physical sensors may be individually controllable. The plurality of physical sensors in one sub-region may be grouped together or collectively controlled, and logically function as one optical sensor. In some other examples, each sub-region may include only one integrated optical sensor.

The target signal range may be a general range shared by all sub-regions. Alternatively, the target signal range may also be region-specific or sensor-specific, where each sub-region may have a target signal range different from one another.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

Other examples of the present disclosure will readily available to those skilled in the art based on the specification and practice of the present disclosure. The present disclosure is intended to cover any variations, uses, or adaptations of the present disclosure following the general principles thereof and including common general knowledge or customary practice in the art not specifically recited in the disclosure.

It is to be understood that, the present disclosure is not limited to the accurate structure that has been described above and illustrated in the accompanying drawings, and various modifications and changes may be made without departing from the scope of the present disclosure.

What is claimed is:

1. A terminal device, comprising:
   a display screen including a display region;
   a plurality of optical sensors configured for fingerprint detection, wherein the plurality of optical sensors are arranged in a plurality of sub-regions within the display region, and each of the plurality of sub-regions has a respective optical parameter; and
   a processor, configured to:
   control the plurality of optical sensors in each of the plurality of sub-regions to, upon detecting a target object, sense the target object with a first optical parameter value, and obtain a first sensing signal in each of the plurality of sub-regions, wherein the target object comprises a finger of a user;
   set an upper limit, a lower limit, and a target signal range defined by the upper limit and the lower limit according to a mean value of the first sensing signal obtained in each of the plurality of the sub-regions;
   determine a second optical parameter value with respect to each of the plurality of sub-regions according to the first sensing signal and the target signal range; and
   set the optical parameter of each of the plurality of sub-regions to the second optical parameter value.

2. The terminal device of claim 1, wherein the processor is further configured to:
   control each of the plurality of sub-regions to sense the target object with the second optical parameter value and obtain a second sensing signal in each of the plurality of sub-regions;
   determine whether the second sensing signal in each of the plurality of sub-regions is within the target signal range; and
   when the second sensing signal in each of the plurality of sub-regions is not within the target signal range, continue adjusting the optical parameter of each of the plurality of sub-regions according to the second sensing signal in each of the plurality of sub-regions and the target signal range.

3. The terminal device of claim 1, wherein the optical parameter comprises an exposure parameter of the optical sensor in each of the plurality of sub-regions.

4. The terminal device of claim 3, wherein the exposure parameter comprises at least one of an exposure time or a number of exposures per unit time.

5. The terminal device of claim 1, wherein the optical parameter comprises a luminous intensity of a corresponding sub-region of the display screen.

6. The terminal device of claim 5, wherein the display screen comprises an Organic Light-Emitting Diode (OLED) display region with the plurality of sub-regions, and the plurality of optical sensors are arranged below the OLED display region.

7. The terminal device of claim 1, wherein determining the target signal range according to the mean value of the first sensing signal in each of the plurality of sub-regions comprises:
the processor determining the mean value of signals sensed by the plurality of optical sensors as the first sensing signal in each of the plurality of sub-regions.

8. A sensing method, applicable to a terminal device, wherein the terminal device comprises a display screen including a display region, a plurality of optical sensors configured for fingerprint detection, the plurality of optical sensors are arranged in a plurality of sub-regions within the display region, and each of the plurality of sub-regions has a respective optical parameter, wherein the method comprises:
controlling the plurality of optical sensors in each of the plurality of sub-regions to, upon detecting a target object, sense the target object with a first optical parameter value to obtain a first sensing signal in each of the plurality of sub-regions, wherein the target object comprises a finger of a user;
setting an upper limit, a lower limit, and a target signal range defined by the upper limit and the lower limit according to a mean value of the first sensing signal obtained in each of the plurality of the sub-regions;
determining a second optical parameter value with respect to each of the plurality of sub-regions according to the first sensing signal and the target signal range; and
setting the optical parameter of each of the plurality of sub-regions to the second optical parameter value.

9. The sensing method of claim 8, further comprising:
controlling each of the plurality of sub-regions to sense the target object with the second optical parameter value and obtain a second sensing signal in each of the plurality of sub-regions;
determining whether the second sensing signal in each of the plurality of sub-regions is within the target signal range; and
when the second sensing signal in each of the plurality of sub-regions is not within the target signal range, continuing adjusting the optical parameter of each of the plurality of sub-regions according to the second sensing signal in each of the plurality of sub-regions and the target signal range.

10. The sensing method of claim 8, wherein the optical parameter comprises an exposure parameter of the optical sensor in each of the plurality of sub-regions.

11. The sensing method of claim 10, wherein the exposure parameter comprises at least one of an exposure time or a number of exposures per unit time.

12. The sensing method of claim 8, wherein the optical parameter comprises a luminous intensity of a corresponding sub-region of the display screen.

13. The sensing method of claim 12, wherein the display screen comprises an Organic Light-Emitting Diode (OLED) display region including the plurality of sub-regions, and the plurality of optical sensors are arranged below the OLED display region.

14. A sensing apparatus, comprising:
a display screen including a display region;
a processor;
a plurality of optical sensors configured for fingerprint detection, wherein the plurality of optical sensors are arranged in a plurality of sub-regions within the display region, and each of the plurality of sub-regions has a respective optical parameter; and
a non-transitory storage medium configured to store instructions executable by the processor,
wherein the instructions, when executed, cause the processor to:
control the plurality of optical sensors in of the plurality of sub-regions to, upon detecting a target object, sense the target object with a first optical parameter value to obtain a first sensing signal in each of the plurality of sub-regions, wherein the target object comprises a finger of a user;
set an upper limit, a lower limit, and a target signal range defined by the upper limit and the lower limit according to a mean value of the first sensing signal obtained in each of the plurality of the sub-regions;
determine a second optical parameter value with respect to each of the plurality of sub-regions according to the first sensing signal and the target signal range; and
set the optical parameter of each of the plurality of sub-regions to the second optical parameter value.

15. The sensing apparatus of claim 14, wherein the processor is further caused to:
control each of the plurality of sub-regions to sense the target object with the second optical parameter value and obtain a second sensing signal in each of the plurality of sub-regions;
determine whether the second sensing signal in each of the plurality of sub-regions is within the target signal range; and
when the second sensing signal in each of the plurality of sub-regions is not within the target signal range, continue adjusting the optical parameter of each of the plurality of sub-regions according to the second sensing signal in each of the plurality of sub-regions and the target signal range.

16. The sensing apparatus of claim 14, wherein the optical parameter comprises an exposure parameter of the optical sensor in each of the plurality of sub-regions.

17. The sensing apparatus of claim 16, wherein the exposure parameter comprises at least one of an exposure time or a number of exposures per unit time.

18. The sensing apparatus of claim 14, wherein the optical parameter comprises a luminous intensity of a corresponding sub-region of the display screen.

19. The sensing apparatus of claim 14, wherein the display screen comprises an Organic Light-Emitting Diode (OLED) display region comprising the plurality of sub-regions, and the plurality of optical sensors are arranged below the OLED display region.

* * * * *